United States Patent [19]

Okamoto et al.

[11] 4,027,292
[45] May 31, 1977

[54] SYNCHRONOUS DATA PROCESSING SYSTEM HAVING ARITHMETIC AND CONTROL UNITS CONTROLLED BY SINGLE-PHASE CLOCK PULSES

[75] Inventors: Kiyokazu Okamoto; Masayoshi Isomura; Atsuto Kobayashi, all of Tokyo, Japan

[73] Assignee: Nippon Electric Company, Limited, Tokyo, Japan

[22] Filed: Dec. 27, 1974

[21] Appl. No.: 536,779

[30] Foreign Application Priority Data

Dec. 29, 1973 Japan .............................. 49-1116

[52] U.S. Cl. .......................................... 340/172.5
[51] Int. Cl.[2] ...................... G06F 7/38; G06F 9/06; G06F 13/00
[58] Field of Search ................ 340/172.5; 235/156, 235/165

[56] References Cited

UNITED STATES PATENTS

| | | | |
|---|---|---|---|
| 3,328,566 | 6/1967 | Kinzie et al. | 235/165 |
| 3,331,954 | 7/1967 | Kinzie et al. | 235/156 |
| 3,387,273 | 6/1968 | Carter et al. | 340/172.5 |
| 3,555,516 | 1/1971 | Proctor | 340/172.5 |
| 3,686,490 | 8/1972 | Goldstone | 235/156 |
| 3,755,784 | 8/1973 | Greek, Jr. et al. | 340/172.5 |
| 3,890,600 | 6/1975 | Roche | 340/172.5 |
| 3,899,667 | 8/1975 | Simone | 235/156 |

*Primary Examiner*—Melvin B. Chapnick
*Attorney, Agent, or Firm*—Sughrue, Rothwell, Mion, Zinn & Macpeak

[57] ABSTRACT

A synchronous digital data processing system employing single-phase clock pulses comprises arithmetic and control units which are capable of completing an operation during one clock pulse period. The data processing system includes closed data paths wherein only one stage of a memory circuit capable of the same operation as a master/slave flip-flop is used as a data register in the arithmetic unit and as an address register in the control unit. In either case, during one cycle of a single-phase clock pulse, an input data is set in the memory circuit, and the output of the memory circuit is renewed in response to the input data. The output of the memory circuit is held until it is renewed in the following cycle.

4 Claims, 8 Drawing Figures

① TRANSMISSION GATE CLOSED
② INPUT GATE OPENED
③ INPUT GATE CLOSED
④ TRANSMISSION GATE OPENED

SYNCHRONOUS DATA PROCESSING SYSTEM HAVING ARITHMETIC AND CONTROL UNITS CONTROLLED BY SINGLE-PHASE CLOCK PULSES

BACKGROUND OF THE INVENTION

1. Field of the Invention

This invention relates to an information processing system, and more particularly, to an information processing system with an improved arithmetic and control units.

The operation of a digital computer is classified into two groups. One is a synchronous operation in which data are transferred between the respective elements in synchronism with clock pulses and the operations of the respective elements are also carried out in synchronism with the clock pulses. The other is called an asynchronous operation. This invention relates to the synchronous operation, as mentioned previously.

2. Description of The Prior Art

In the conventional synchronous information processing system various clock pulses, such as multiphase-multicycle (or single cycle) pulses and single-phase-multicycle pulses, have been used in order to avoid adverse effects of the differences in time period needed for the actuation of the memory unit, for data transmission through the respective circuits or elements employed in the arithmetic unit and/or control unit, and for data processing. In other words, a plurality of multiphase clock pulses having their phases shifted from each other are generated corresponding to a plurality of timings for the control operations of the respective stages in accordance with the speeds of the respective circuit operations. The operation is performed in such a manner for instance, that a control signal for opening a gate is generated at that a timing of a first clock pulse, the setting of the data passed through the gate in the register is achieved at a timing of a second clock pulse, the renewal of an address register for generating the following control signal is achieved at the timing of a third clock pulse, and the generation of a stable control signal is achieved again at the timing of the following first clock pulse. Alteratively, the operation may be in such a manner that in the memory unit, an address of a core memory is stored in an address register at the timing of the first clock pulse, than this address is designated for the core memory to set the core memory for a data register corresponding to this address at the timing of the second clock pulse, and the contents of this data register are re-written in a core area corresponding to the same address and simultaneously therewith these data are transferred to an arithmetic unit at the timing of the third clock pulse.

In these conventional systems, closed data paths are provided in the arithmetic unit and the control unit, respectively. In each of the closed data paths, a plurality of stages of memory means are employed, to which the clock pulses having different timings from each other are applied. Consequently, not only the data processing time of the processor is long, but also a great many circuits or circuit elements are required which complicate the data processor as a whole. In a synchronous computer, the complexity and operational speed of each unit are determined by how many periods and clock pulses of how many different kinds of clock pulses are required for finishing an operation responsive to the control signals. Therefore, if an operation responsive to the control signals can be finished during a minimum number of cycles of clock pulses and a minimum number of different kinds of clock pulses while generating the next control signals within the same period of time, then a high operational speed can be attained with a more simple construction. Optimally, if control signals are generated, which have a duration of only one cycle and which are renewed in each cycle so that each unit may finish the operation responsive to the control signals within one cycle, then the highest speed would be obtained with a simple construction.

SUMMARY OF THE INVENTION

It is, therefore, an object of this invention to provide an improved information processing system in which each of an arithmetic operation, a writing operation, a branching operation, and an interrupting operation can be completed during only one cycle of a single-phase clock pulse.

According to this invention, there is provided an information processing system comprising register means installed in a closed data path, in which during one cycle of a single-phase clock pulse, an input data is set in a register, and the output of said register is renewed in response to said input data. The output of said register is held until it is renewed in the following cycle. The register means are employed as a data register and an address register in an arithmetic unit and a control unit, respectively, whereby operation of the arithmetic unit in response to control signals from the control unit and a renewal of the control signals are completed during one cycle of the single-phase clock pulse.

BRIEF DESCRIPTION OF THE DRAWING

The features and advantages of this invention will be better understood from the following detailed description of preferred embodiments of this invention taken in conjunction with the accompanying drawings, wherein.

DESCRIPTION OF THE PREFERRED EMBODIMENTS

Figure 1:
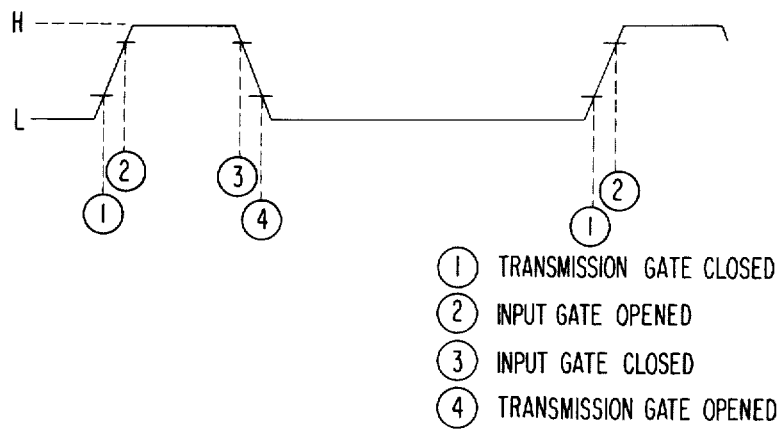
FIG. 1 shows a waveform diagram of a single-phase clock pulse used in this invention.

It has been known that even when disposed in closed paths, master/slave flip-flop may store an input data and renew its output in response to the input data by the use of a single-phase clock pulse without causing race condition. It has been also known that a register composed of such master/slave flip-flops may function ordinarily without causing a race condition by the use of a single-phase clock pulse when disposed in the closed data path. The master/slave flip-flop may be composed of an input gate, a master flip-flop, a slave flip-flop, and a transmission gate between the master and the slave flip-flops. Assuming now that a clock pulse as shown in FIG. 1 is applied to the master/slave flip-flop, then as the level of the clock pulse changes in the order of "L" → "H" → "L", the transmission gate is closed at the timing ①, the input gate is opened at the timing ② to admit the input data to the master flip-flop, and thus the master changes its memory state in accordance with the input data. Further at the timing ③ the input gate is closed, and at the timing ④ the transmission gate is opened to transfer the data stored in the master flip-flop to the slave flip-flop and to emit the same as an output from the slave flip-flop.

Now the operation of the master/slave flip-flop will be described assuming that the master-slave flip-flop is installed in a closed data path.

Figure 2A:
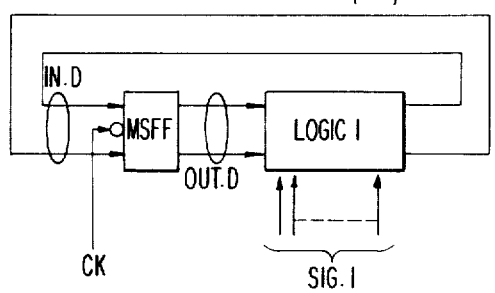
FIGS. 2A and 2B are block diagrams illustrating principles of this invention.

With reference to FIG. 2a, output data OUT-D of a master/slave flip-flop MSFF are applied to a logic circuit LOGIC 1. The other input signals and control signals SIG 1 for determining the status of the logic circuit LOGIC 1 are applied to the logic circuit LOGIC 1. An output of the logic circuit LOGIC 1 is applied to the flip-flop MSFF as its input IN-D, whereby one closed data path is established.

Figure 2B:
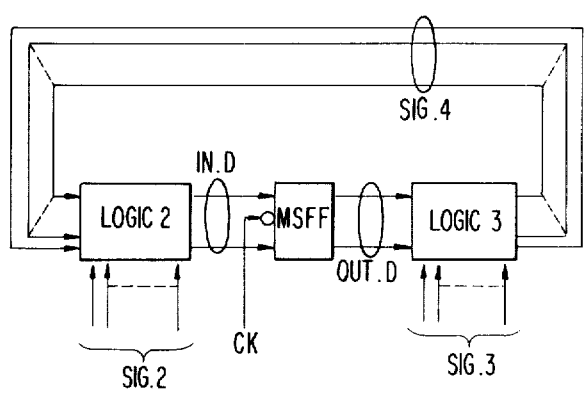

When a clock pulse CK changes it level as shown in FIG. 1, at the timing ④ the output OUT-D of the master/slave flip-flop MSFF is applied to the logic circuit LOGIC 1, and the controls signals SIG 1 are also applied thereto at the timing ④ or thereabout (after the timing ③ at the earliest but preferably at a time not largely delayed from the timing ④). As a result, the output of the logic circuit LOGIC 1, i.e., the input IN-D of the flip-flop MSFF are varied and restabilized. However, since the input gate of the flip-flop MSFF is kept closed until the next timing ②, neither the master flip-flop nor the slave flip-flop of the flip-flop MSFF are subjected to any variation in the memory contents. At the next timing ②, the input IN-D is transmitted to the master flip-flop because the input gate is opened. If the input IN-D changes its level during the period between the timing ② and the timing ③, then the result will be such that an undesired signal level is set in the master flip-flop. Therefore, it is necessary to have the input IN-D stabilized prior to the timing ②. Even though the memory contents of the master flip-flop are renewed in response to the input IN-D, this does not influence the slave-flip-flop because the transmission gate between the master and slave has been already closed before the timing ①. It is a matter of course that the stabilization of the input IN-D should occur preferably before the timing ②. For that purpose, it is only necessary to generate the clock pulse CK so as to define the time interval from the timing ④ to the subsequent timing ② in accordance with the performance of the logic circuit LOGIC 1. The memory contents which have been set in the master flip-flop by the timing ③ are transmitted to the slave flip-flop at the next timing ④, thereby to renew the output OUT-D of the master/slave flip-flop MSFF. In this connection, the time interval from the timing ② to the timing ④ in the pulse CK can be determined depending on the performance of the flip-flop MSFF itself. Since no race condition occurs in the circuits as shown in FIG. 2a, there is no need for providing a register for inhibiting data circulation in a data path. A modification of the apparatus of FIG. 2a is shown in FIG. 2B. In more particular, the logic circuit LOGIC 1 is, in appearance, divided into logic circuit LOGIC 2 and LOGIC 3, an output SIG. 4 of the circuit LOGIC 1 being applied to the circuit LOGIC 2 as its input, and the other input data and control signals for the circuits LOGIC 2 and LOGIC 3 are applied to them as signals SIG. 2 and SIG. 3, respectively. If the input IN-D (that is, the output of the circuit LOGIC 2) of the master/slave flip-flop MSFF is stabilized, during the period from the timing ④ to the timing ⑤, then the apparatus shown in FIG. 2 (2) can also complete the operation of renewing the memory contents of the master/slave flip-flop MSFF during only one cycle period of the clock pulses CK.

While the description has been made above in connection with the case where a master/slave flip-flop is used as a memory element disposed in the closed data path to store its input and renew without developing a race condition in its output in response to an input by making use of the single-phase clock pulses, it is a matter of course that similar functions can be achieved by employing an edge triggered flip-flop and the like which perform in a manner similar to a master/slave flip-flop.

As described above, it will be apparent that an apparatus for completing its operation during one cycle period of single-phase clock pulses can be obtained by using in a closed data path only one stage of memory circuit or a circuit capable of the same operation as a master/slave flip-flop. In this connection, when the data are fed from another unit, it is also possible to constitute said another unit so that the data may be renewed during one cycle of single-phase clock pulses, by employing, as a memory circuit in the closed data path of the another unit, only one stage of memory circuit similar to a master/slave flip-flop. Thus, it can be seen that a combined apparatus consisting of apparatuses each being operable during one cycle of single-phase clock pulses is also operable during one cycle of single-phase clock pulses.

Figure 3:
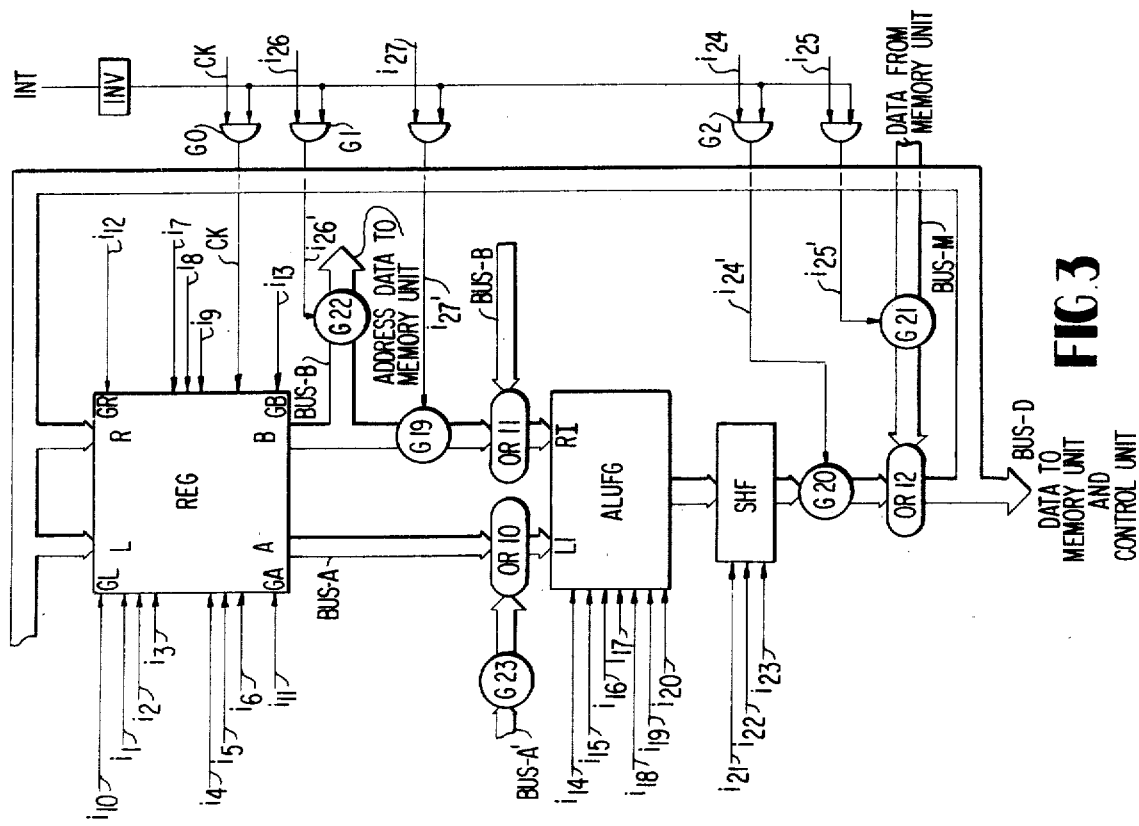
FIG. 3 is a block diagram of an arithmetic unit of an embodiment of this invention.

Referring to FIG. 3, an arithmetic unit of an embodiment of this invention comprises a registor REG, which may be of an integrated circuit device Model SN74172 disclosed in *The TTL Data Book For Design Engineers*, Texas Instruments Inc. p.p. 356 - 359. The integrated circuit device SN74172 comprises, two ports of data inputs and two ports of data outputs and eight 2-bit registers of one stage having the same operation as master/slave flip-flop. On the input side of the register REG, there are provided two dimultiplexers, to which 3-bit write address data in the form of the sets $i_1$, $i_2$ and $i_3$, and a $i_7$, $i_8$ and $i_9$, and a write enable signals $i_{10}$ and $i_{12}$ are applied as control signals, thereby transmitting the data consisting of a logical sum of the data of 2 bits on the L and R sies to the storage register in the register REG designated by the address data, upon application of the clock pulse CK'. Furthermore, on the output side of the register REG, there are provided two multiplexers to which 3-bit read address data in the form of the sets $i_4$, $i_5$ and $i_6$, and $i_7$, $i_8$ and $i_9$, and read enable signals $i_{11}$ and $i_{13}$ are applied as control signals, thereby emitting the contents of 2 bits of the storage register designated by the address data at the two outputs of register REG on the A-side and on the B-side independently of each other. Therefore, if eight Texas Instruments of integrated circuits Type SN74172 are connected in parallel with each other so that they may respectively receive the control signals $i_1$, $i_2$ . . . . $i_{13}$ and the clock pulses CK', then data of 16 bits can be received at the inputs on the L-side and on the R-side of the register REG consisting of eight SN74172's. To both of these inputs are connected data bus BUS-D. In addition, the respective outputs on the A-side and on the B-side of this register REG can emit data of 16 bits as an output and are connected to data buses BUS-A and BUS-B, respectively. The bus BUS-A is connected to an OR-circuit OR10, said the bus BUS-B is connected to OR-circuit OR11 via a gate G19. Also, the BUS-B connected via a gate G22 to apply an address code to a memory unit (not shown) when a control signal $i_{28}$ is logical "1". The read-out data in the memory unit corresponding to the address code are applied to a gate G21 via a memory bus BUS-M, and when a control signal $i'_{25}$ for the gate G21 is logical "1", the data are applied to a data bus BUS-D through the gate G21 and an OR-circuit OR12.

The OR-circuit OR10 additionally receives data on a bus BUS-A' via a gate G23. The gate G23 is adapted to open when a control signal $i_{30}$ is logical "1". The output of the OR-circuit OR10 and the output of the OR-circuit OR11 connected to a bus BUS-B' are respectively connected to the left side input LI and the right side input RI of an arithmetic-logic circuit ALUFG.

The circuit ALUFG is supplied with function selection codes $i_{14} - i_{17}$, a made control bit $i_{18}$ and a carry control code $i_{19}$ and $i_{20}$ as its control signals, and processes the input data applied to the inputs LI and RI and transmits an output to a shifter circuit SHF. The circuit ALUFG may be composed of a combination of the Texas Instruments integrated circuits, SN74181 disclosed on pages 381 - 391 and SN74182 disclosed on pages 392 - 395 of the abovementioned publication. The circuit SHF is adapted to receive a control code $i_{21} - i_{23}$ and to emit at its output the data which are equal to the input data per se or which are those shifted by the amount designated by the control code and to apply the output to a gate G20. The gate G20 is adapted to open when its control signal $i'_{24}$ is logical "1", thereby to supply the data to the OR-circuit OR12. The output of the OR-circuit OR12 is distributed via data bus BUS-D to the inputs L and R of the register REG, a control unit shown in FIG. 4, and various other points. While the clock pulses CK' and the control signals $i'_{24}$, $i'_{25}$, $i'_{26}$ and $i'_{27}$ are respectively produced from the clock pulses CK and the control signals $i_{24}$, $i_{26}$ and $i_{27}$, when an interruption signal INT is applied from an interruption circuit (not shown) they would become all logical "0" owing to the existence of an inverter circuit INV. Therefore, if the interruption signal INT is logical "1", the contents of the register REG cannot be renewed regardless of what combination of logical states are taken by the control signals $i_1 - i_{27}$ and $i_{30}$, and also the memory address cannot be designated, resulting in all zeros of the data on the data bus BUS-D. This will be described later with reference to FIG. 4 in the explanation on the interrupted operation of the control. It is to be noted that the control unit in FIG. 4 produces the control signals $i_1 - i_{27}$ and $i_{30}$.

The operation of the arithmetic unit in FIG. 3 is essentially the same as the operation of the conventional unit. However, what is definitely different therebetween is that in the latter multi-phase clock pulses are needed for the operation performed in response to a set of control signals, whereas in the former it is only necessary to use single-phase clock pulses CK, one cycle being enough to complete an operation. In the former, only one stage of register (the register designated by REG in FIG. 3) is disposed in the closed data path.

Now an operation for the case where data are derived from a memory unit (not shown) connected between an output of the gate G22 and an input of the gate G21 and set in a designated register in the arithmetic unit shown in FIG. 3, will be described hereinunder. It is assumed that the interruption signal is logical "0".

Now assuming that the control signals $i_{13}$, $i_{26}$ and $i_{25}$ are logical "1", the contents stored in the register REG designated by the address code $i_7$, $i_8$ and $i_9$ are applied to the memory unit through the gate G22 as an address code of the memory unit. The corresponding output data from the memory unit are applied to the bus BUS-D through the gate G21 and the OR-circuit OR12. When the write enable signal $i_{10}$ is logical "1", the output data of the memory unit are applied to the input of the storage register in the, register REG designated by the address code $i_1$, $i_2$ and $i_3$ and further, if the write enable control signal $i_{12}$ is logical "1", the output data are simultaneously applied to the input of the register designated in the register REG by the address code $i_7$, $i_8$ and $i_9$ (this designated register being that register whose contents are now being applied to the output B). In this case, the data are set in the two storage registers in response to the clock pulse CK as shown in FIG. 1. This operation can be completed during one cycle of the single-phase clock pulse CK.

To summarize the conditions of the relevant control signals upon reading out the data corresponding to the designated address from the memory unit, the following are obtained:

Signal INT .. logical "0" ⇐ ——— Opens the gates G0, G1 and G2 for the clock pulses CK and the signals $i_{24}$ and $i_{25}$.

-continued

| Signal | Description |
|---|---|
| Signal $i_{26}$ ... logical "1" | Opens the gate G22 for transmitting the data on the bus BUS-B to the address code memory unit. |
| | Establish the condition for read out the memory unit. |
| Signal $i_{25}$ ... logical "1" | Open the gate G21 connected to the bus BUS-M for transmitting the read-out data from the memory unit corresponding to the designated address, and close the gate G20 connected to the output of the shift register circuit SHF so as to transmit through the bus BUS-D only the read-out data from the memory unit. |
| Signal $i_{24}$ ... logical "0" | |
| Signal $i_{13}$ ... logical "1" | Transmits through the bus BUS-B the contents of the storage register in the register REG designated by the code $i_7$, $i_8$ and $i_9$ (the address code to be applied to the memory unit). |

When the contents of the storage register designated by the code $i_4$, $i_5$ and $i_6$ are written through the bus BUS-D in a writable memory unit such as the register REG or a semiconductor random access memory at an address designated by the contents of the register, that is designated by the code $i_7$, $i_8$ and $i_9$, the following are obtained. Here it is assumed that the bus BUS-D is connected to a write-in port of the memory unit:

| Signal | Description |
|---|---|
| Signal INT ... logical "0" | Opens the gates G0, G1 and G2 for the clock pulses CK and the signals $i_{26}$ and $i_{24}$. |
| Signal $i_{11}$ ... logical "1" | Transmits as an output on the bus BUS-A the contents of the register designated by the code $i_4$, $i_5$ and $i_6$ within the register REG. |
| Signal $i_{26}$ ... logical "1" | Opens the gate G22 for transmitting the data on the bus BUX-B to the memory unit as an address for the memory unit. |
| | Establish the condition for writing in the memory unit. |
| Signal $i_{27}$ ... logical "0" | Closes the gate G19 so as not to transmit the data on the data bus BUS-B to the logic circuit ALUFG. |
| Signal $i_{24}$ ... logical "1" | Opens the gate G20 so as to transmit the output of the shifter circuit SHF to the bus BUS-D. |
| Code of Signals $i_{14} \sim i_{23}$ | Prescribe the operations of the circuit ALUFG and the shifter circuit SHF so that the input at LI of the Circuit ALUFG may be in itself made an output of the shifter circuit SHF without any variation. |

-continued

| Signal | Description |
|---|---|
| Signal $i_{13}$ ... logical "1" | Transmits as an output onto the bus BUS-B the contents of the register designated by the code of the signals $i_7$, $i_8$ and $i_9$ within the register REG. |

This memory write-in operation is also completed during one cycle of single-phase clock pulses CK.

Figure 4:
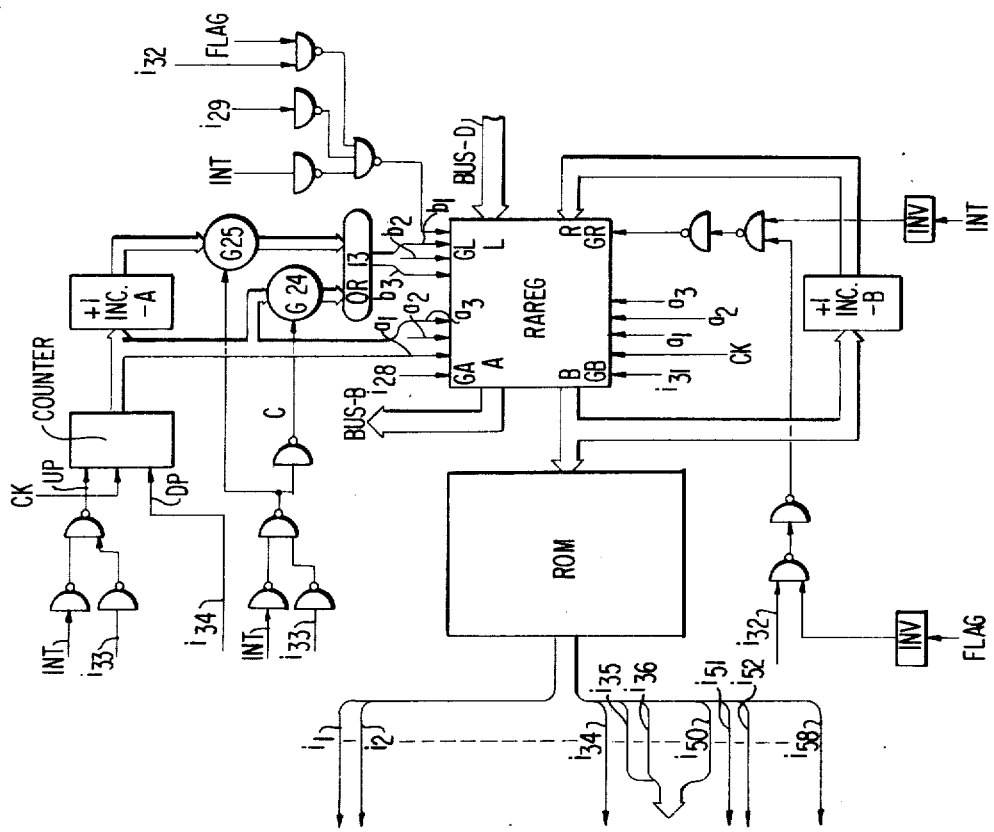
FIG. 4 is a block diagram of a control unit of an embodiment of this invention.

Now, one preferred embodiment of a control unit in which the control signals used in the arithmetic unit in FIG. 3 are renewed similarly during one cycle of clock pulses CK, will be described with reference to FIG. 4. In FIG. 4, when a control signal $i_{31}$ is logical "1", an address register RAREG produces a signal designating an address in a read-only memory ROM. The address register RAREG may be composed of a necessary number of Texas Instruments Type SN74172 integrated circuits. For instance, when the read-only memory ROM has addresses of 0 – 1024, it is necessary to give data of 10 bits to the memory ROM. Therefore, five SN74172 integrated circuits are necessary to construct the register RAREG. In other words, eight 10-bit registers are contained within the address register RAREG. Accordingly, it is necessary at first to indicate the contents of which one of the eight storage registers should be applied to the memory ROM as an address. The register is determined by 3-bit address codes $a_1$, $a_2$ and $a_3$, and $b_1$, $b_2$ and $b_3$. These address codes are generated by a reversible counter having a capacity of 3 bits, in which the contents are added by +1 and −1 in response to the application of a clock pulse CK when a signal UP is logical "1", and a signal DP is logical "1", respectively. The address codes $a_1$, $a_2$ and $a_3$ are applied to the address register RAREG, a gate G24 and an incremental circuit +1 INC-A. The gate G24 transmits the output code $a_1$, $a_2$ and $a_3$ of the counter COUNTER to an OR-circuit OR13, when the control signal C is logical "1". In this case, the code ($b_1$, $b_2$, $b_3$) is equal to the code ($a_1$, $a_2$, $a_3$). The output of the incremental circuit +1 INC-A is applied to a gate G25. When an interruption signal INT or a control signal $i_{33}$ corresponding to a subroutine jump is logical "1" (in this case the control signal C is logical "0"), the gate G25 transmits the output of the incremental circuit +1 INC-A to the OR-circuit OR13. The following relation is then obtained:

Code ($b_1$, $b_2$, $b_3$) = code formed by adding code (1, 0, 0) to code ($a_1$, $a_2$, $a_3$)

Figure 5:
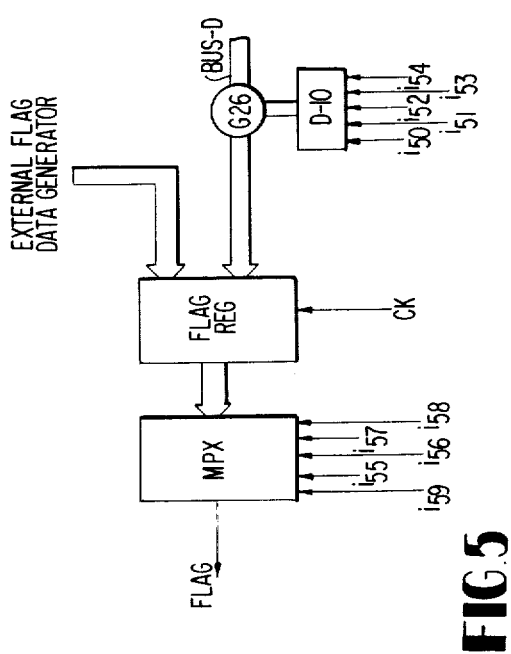
FIG. 5 is a block diagram of a conditioning circuit employed in an embodiment of this invention.

As a storage register within the address register RAREG which can generate data on the A-side and B-side of the output, one of the 8 registers within the address register RAREG is always designated by the address code ($a_1$, $a_2$, $a_3$). The data on the data bus BUS-D is set in a storage register within the address register RAREG when a signal FLAG applied from a conditioning circuit as shown in FIG. 5 and a control signal $i_{32}$ are logical "1", or either the interruption signal INT or a control signal $i_{29}$ is logical "1", i.e., at the timing 4 of the clock pulse CK as shown in FIG. 1. One of the eight storage registers is designated by the code $b_1$, $b_2$ and $b_3$ as the register in which the data are to be set. Accordingly, if the register in which the data on the bus BUS-D have been set is also designated by the code $a_1$, $a_2$ and $a_3$, then the same storage register can generate on the A-side and B-side of the output the data set from the data bus BUS-D. As a result, the address fed to the readonly memory ROM is, generally, varied in a discontinuous manner. Next, the addition of +1 to the contents of the register designated by the address code $a_1$, $a_2$ and $a_3$, that is, the setting of the output of the incremental circuit +1 INC-B in the same register, is carried out only when both the interruption signal INT and the output signal FLAG from the conditioning circuit are logical "0" and both the control signals $i_{31}$ and $i_{32}$ are logical "1". In this case, the address designated for the memory ROM is added with +1 without jumping. The is also carried out when the clock pulse CK is applied.

When the control signal $i_{28}$ is logical "1", the contents of the storage register designated by the address code $a_1$, $a_2$ and $a_3$ are obtained at the output terminal A and applied to the arithmetic unit as shown in FIG. 3 via the data bus BUS-B', to renew the contents of the register by means of the circuit ALUFG in the arithmetic unit and then transmit them to the data bus BUS-D, thereby to set the data on the bus BUS-D in a storage register in register RAREG designated by the code $b_1$, $b_2$ and $b_3$.

Now the read-only memory ROM which has its address designated by the address register RAREG, generates a control signal code $i_1$, $i_2$, .... $i_{60}$. Among these control signals $i_1$, $i_2$, .... $i_{27}$ and $i_{30}$ are applied to the arithmetic unit as shown in FIG. 3, while the control signals $i_{35}$ .... $i_{50}$ of 16-bit are applied to the gate G23 in said arithmetic unit through the bus BUS-A'. The control signals $i_{51}$, $i_{52}$ .... $i_{60}$ are applied to the conditioning circuit (FIG. 5), and the control signals $i_{28}$, $i_{29}$, $i_{31}$, $i_{32}$, $i_{33}$ and $i_{34}$ are used in this control unit.

It is to be noted that the control unit according to the present invention necessitates only single-phase clock pulses, and only one stage of address register is used in the closed data path.

How the control unit achieves the renewal of the control signals in a program proceeding operation, conditioned branch operation, subroutine branch operation and interrupt operation during one cycle of the single-phase clock pulses CK, will be described hereinafter.

Program Proceeding Operation

The address applied to the read only memory ROM is added by +1 in every cycle of the clock pulses. In this case, it is unnecessary to change the address code $a_1$, $a_2$, $a_3$ applied from the counter COUNTER, and to set the data on the data bus BUS-D. Accordingly, the necessary conditions for the control signals are as follows:

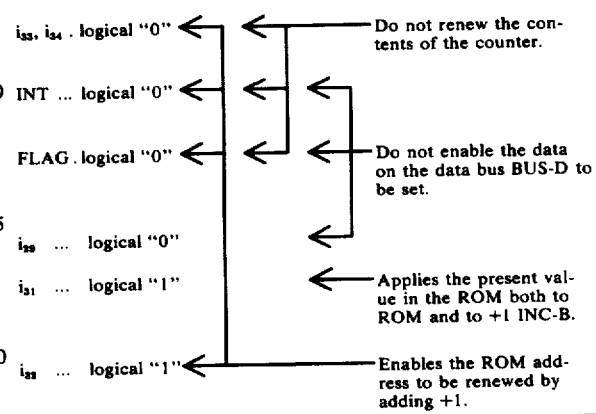

The renewal operation above is achieved at the timing ④ in the clock pulse CK.

Conditioned Branching Operation

The address applied to the read-only memory ROM is renewed to the value given by the data bus BUS-D when the output signal FLAG from the conditioning circuit (FIG. 5) is logical "1", while when logical "0", it is renewed with the addition of +1 similarly to the normal program proceeding operation.

Thus, the necessary conditions are as follows:

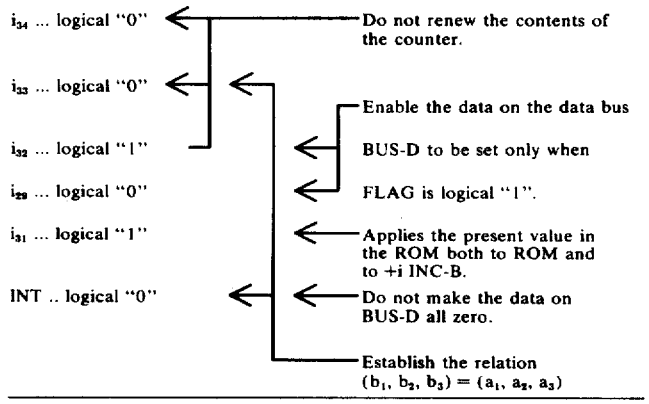

The renewal operation is achieved at the timing ④ in the clock pulse CK.

Subroutine Branching Operation

The address applied to the read-only memory ROM is renewed to the value given on the bus BUS-D (the start address of the subroutine), and after the subroutine has been completed, the value obtained by adding +1 to the address just prior to the jumping to the subroutine is applied to the read-only memory ROM as a start address after escape from the subroutine.

Thus, the necessary conditions, for jumping to the subroutine are as follows:

The operation for adding +1 to the contents of COUNTER and the operation for setting is achieved at the timing in the clock pulse CK. As a result, the address applied to the read-only memory ROM skips to the data given on the bus BUS-D in the preceding cycle of the clock puses CK. Also, the address data applied to the read-only memory in the preceding cycle, is in itself added with +1 and then is set in a storage register within the register RAREG that was designated by the address code $a_1$, $a_2$ and $a_3$ in the preceding cycle.

Subsequently, the necessary conditions upon escaping from the subroutine are as follows:

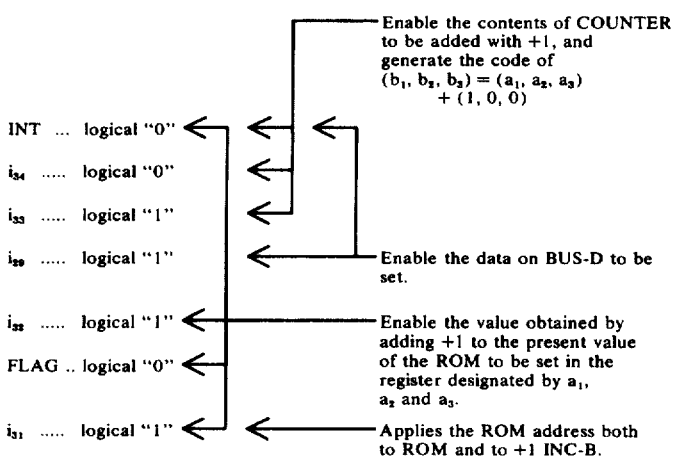

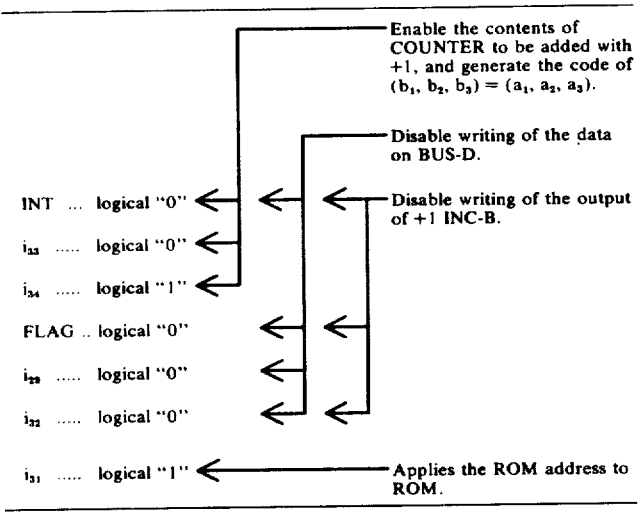

The above-referred escape from the subroutine is achieved at the timing ④ in the clock pulse CK.

Interrupting Operation

An interruption operation-start address to be applied to the read-only memory ROM in the next cycle of the clock pulses CK, is applied to the bus BUS-D. The values of the interruption operation-start address fed from the arithmetic unit are all zeros. The present value of the ROm address that is being applied to the read-only memory ROM is made to be stored without being added with +1 in a storage within the address register RAREG that is designated by the address code $a_1$, $a_2$ and $a_3$. After the interrupion operation has been completed, it is necessary to add −1 to the contents of the counter COUNTER so that the same register may be designated by a code $b_1$, $b_2$ and $b_3$ equal to the code $a_1$, $a_2$, and $a_3$. The necessary conditions for skipping to the subroutine are as follows:

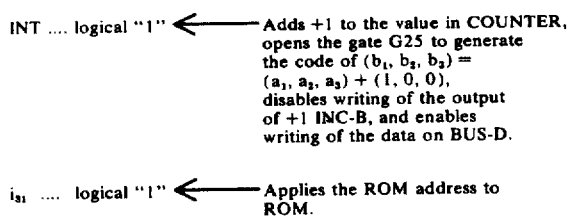

Termination of Interrupting Operation

The necessary conditions in this case are the same as those in the case of escaping from the subroutine, and so description thereof will be omitted. The operations are achieved at the timing ④ in the clock pulse CK.

Now the conditioning circuit will be explained with reference to FIG. 5.

A data bus for transmitting 16-bit flag data from an external flag data generator unit (not shown) is connected to the set-terminal of a flag register FLAG REG composed of 16 JK flip-flops. The setting operation is carried out at the timing ④ when the clock pulse CK is applied.

Next, the signals on the reset terminal will be described. The output of the logic circuit ALUFG of the arithmetic unit shown in FIG. 3 is applied to a gate G26 shown in FIG. 5 through the bus BUS-D of 16 bits. The gate G26 consists of 16 AND-gates, and when the control signal $i_{60}$ is logical "1", the control signals for these 16 AND-gates are generated from a code of $s_1$, $i_{52}$, $i_{53}$ and $i_{54}$ by a decoder D10 in such manner that a control signal for one bit among the given 16 bits may be made logical "1" and the control signals for the remaining 15 bits may be made logical "0". The control signals are applied to the 16 AND-gates, respectively, in the gate G26. Because the outputs of the 16 gates, respectively connected to the reset terminals of said register FLAG REG, any desired flip-flop in the regiter FLAG REG can be reset by the output of the logic circuit ALUFG. The timing upon resetting is the same as that upon setting.

The signal FLAG is produced from contents of the register FLAG REG in the following manner. When a control signal $i_{59}$ is logical "1", the signal FLAG or an output of a multiplexer MPX is generated either as logical "1" or as logical "0" in accordance with the contents of the flip-flop in the register FLAG REG that has been selected by a control code of $i_{55}$, $i_{56}$, $i_{57}$ and $i_{58}$.

Figure 6:
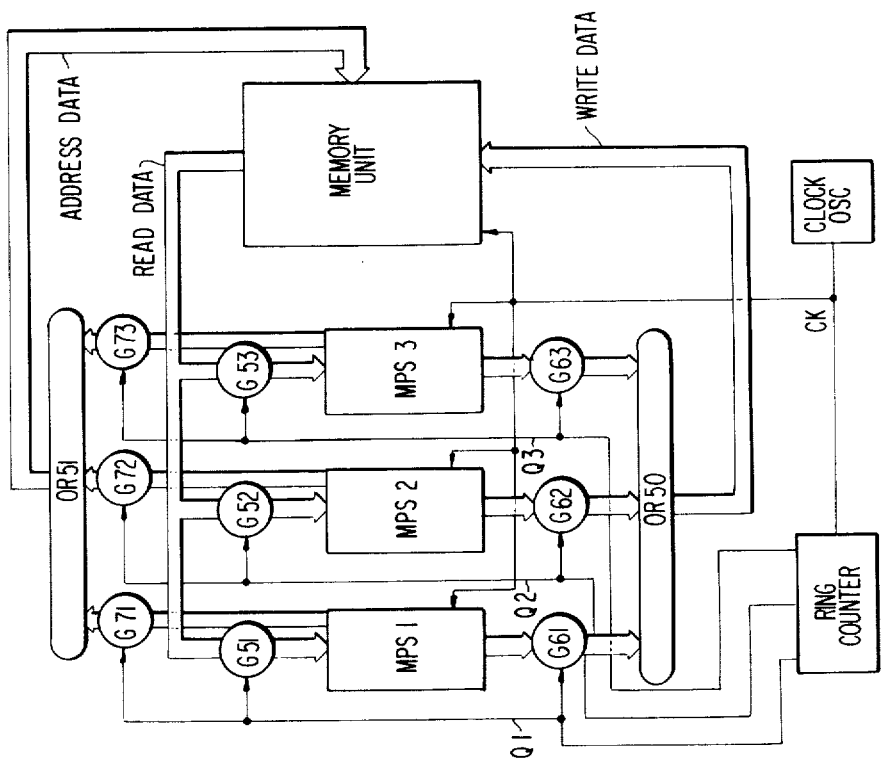
FIG. 6 is a block diagram of another embodiment of this invention.
Figure 6A:
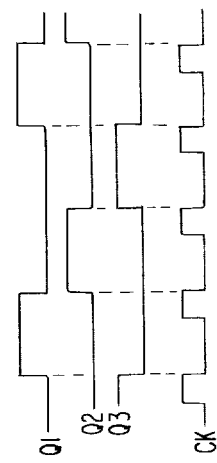
FIG. 6a shows waveform diagrams of control signals appearing at various parts of the embodiment shown in FIG. 1.

FIG. 6 shows a multi-processor system according to this invention comprising a plurality of microprocessor units MPS 1, MPS 2, and MPS 3. The multiprocessor units are adapted to operate independently of each other, individually and in parallel with each other in synchronism with the timing of the clock pulses CK as shown in FIG. 6A.

A memory unit is used on a time-division basis to exchange the data between itself and the microprocessor units MPS1, MPS 2, and MPS 3 in such a manner that the address data are applied through the gates G71, G72 and G73, and the OR-circuit 51 thereto, that the write-in data are applied through the gates G61 G62, and G63, and the OR-circuit 50 thereto, and that the read-out data are applied to the microprocessor units through the gate G51, G52 and G53.

The output of a gate corresponding to the gate G22 in FIG. 3 in each microprocessor set MPS is applied to the gate G71, G72 or G73, respectively. Control signals corresponding to the control signals $i_{25}$ and $i_{26}$ for indicating a read-enable condition and the control signal $i_1$ for indicating a write-enable condition jointly with the control signal $i_{26}$ are applied to the gates G71, G72 and G73, respectively. When any one of the gate signals Q1, Q2 and Q3 for controlling the gates G71, G72, and G73 is logical "1", the output of the corresponding one of the gates is applied through the OR-circuit OR51 to the memory unit MENORY UNIT as the address data and the write-enable or read-enable signals. An input of a gate corresponding to the gate G21 in FIG. 3 in each microprocessor units MPS2 and MPS3 are connected to the gates G51, G52 and G53, respectively. Since any one of the gate signals Q1, Q2 and Q3 opens the corresponding one of the gates G51, G52 and G53, in the case of a read-enable condition, the data corresponding to said address are applied from the memory unit to the microprocessor unit MPS corresponding to the opened gate among the gates G51, G52 and G53. The data are set in a storage register within the register REG of the microprocessor unit MPS at the timing corresponding to the timing ④ in the clock pulse as shown in FIG. 1. In addition, since any one of the gates corresponding to the gates G61, G62 and G63 connected to the bus BUS-D (FIG. 3) is also opened by the control signal Q1, Q2 or Q3, the output data of the OR-circuit OR50 are applied in the write-enable condition to an area of the memory unit corresponding to the address. The data is set at the timing ④ in a clock pulse as shown in FIG. 1.

As described above, by using the elements such as the microprocessor sets MPS, in each of which the operations in response to the control signals and of renewing the control signals are achieved during one cycle of the single-phase clock pulses CK, the multiprocessor system can be easily constructed. This is extremely remarkable in contrast to the case where multiple cycles of multi-phase clock pulses are employed.

Since the arithmetic unit and control units according to the present invention use only single-phase clock pulses CK as described above and since only one stage of register is therefore needed for a closed data path, the construction of the apparatus is much simpler than the prior art apparatus having the same capability. Also since the operations of the arithmetic unit and control unit in response to the control signals and renewal operation for the control signals can be completed during one cycle period of said clock pulses, the subject apparatus has an advantage of increased operational speed. In addition, it should be noted that the construction of a multiprocessor system is simplified and that upon integrating arithmetic units and control units into a large scale integrated circuit (LSI), a great advantage can be obtained in that the circuit is easily contained in a package having a limited number of input and output terminals because the number of kinds of clock pulses is small.

What is claimed is:

1. A synchronous data processing system comprising an arithmetic unit and a control unit each of which is controlled by single-phase clock pulses, said arithmetic unit and said control unit being in the form of first and second closed data paths, respectively, wherein said arithmetic unit comprises:
   first bus lines for transferring data,
   first register means used as a data register having a single stage for storing data transferred by said first bus lines, and
   first logic circuits; said first bus lines, said first register means and said first logic circuits being connected in said first closed data path, said first logic circuits being responsive to first control signals to cause the data to be stored in a selected part of said first register means according to the data supplied from said first bus lines during one cycle of a single-phase clock pulse,
wherein said control units comprises:
   second bus lines for transferring data,
   second register means used as an address register having a single stage for storing data transferred by said second bus lines,
   second logic circuits; said second bus lines, said second data register means and said second logic circuits being connected in said second closed data path, said second logic circuits being responsive to second control signals to cause data to be stored in said second register means according to the data supplied by said second bus lines during one cycle of a single-phase clock pulse, and
   control signal generating means connected to receive an output of said second register means for generating said first and second control signals as a predetermined response to coded output data from said second register means,
   and wherein said second bus lines are connected to said arithmetic unit to form a third closed data path including said second register means and said first logic circuits to exchange data between said arithmetic and control units.

2. A synchronous data processing system as recited in claim 6, wherein said first logic circuits include arithmetic-logic means having two inputs and one output for performing arithmetic and logic operations on operand data supplied to said two inputs and generating resultant data at said output in response to said first control signals, said first register means having two inputs and two outputs and being responsive to said first control signals, the output of said arithmetic-logic means being connected to said inputs of said first register means and the two outputs of said first register means being connected to said two inputs of said arithmetic-logic means to form said first closed data path, said first register means being responsive to said first control signals for storing data supplied to its two inputs and emitting the contents of said first register means at its two outputs independently of each other during one cycle of a single-phase clock pulse, one of said outputs of said first register means being adapted to be connected to supply address data to a memory unit with data to and from the memory unit being adapted to be selectively connected to said first closed data path.

3. A synchronous data processing system as recited in claim 2, wherein said control signal generating means includes a read only memory means having an address input, said read only memory means being responsive to coded output data from said second register means supplied to said address input for generating said first and second control signals, said second logic circuits including address code generating means for generating address codes designated the contents of said second register means to be applied to the address input of said read only memory means in response to said second control signals during one cycle of a single-phase clock pulse, said second register means having two inputs and two outputs for independently storing the data supplied to its two inputs and emitting the contents of said second register means designated by said address codes at its two outputs independently of each other upon application of a single-phase clock pulse, said second logic circuit further including incrementing means having an input and an output for adding one to input data supplied to its input, one of said outputs of said second register means being connected to the address input of said read only memory means and to the input of said incrementing means and the output of said incrementing means being connected to one of the inputs of said second register means to form said second closed data path, and the other output of said second register means being connected to an input of said arithmetic-logic means and the output of said arithmetic-logic means being connected to the other input of said second register means to form said third closed data path.

4. A synchronous digital data processing system as recited in claim 1 comprising a plurality of said arithmetic and control units adapted to operate independently of each other, individually and in parallel with each other in synchronism with the timing of said single-phase clock pulses, and multi-phase gating means responsive to said single-phase clock pulses for connecting said plurality of arithmetic and control units to said a memory unit on a time-division basis.

* * * * *

UNITED STATES PATENT AND TRADEMARK OFFICE
CERTIFICATE OF CORRECTION

PATENT NO. : 4,027,292
DATED : May 31, 1977
INVENTOR(S) : Kiyokazu Okamoto et al It is certified that error appears in the above-identified patent and that said Letters Patent are hereby corrected as shown below:

IN THE SPECIFICATION:

Column 1, line 11, delete "an";

Column 1, line 33, after "control" insert --of--;

Column 1, line 37, delete "that a" and insert --the--;

Column 1, line 39, after "in" delete "the" and insert --a--;

Column 1, line 39, after "at" delete "a" and insert --the--:

Column 2, line 56, "Fig. 1" should be --Fig. 6--;

Column 2, line 62, after "paths," insert --a--;

Column 2, line 64, after "causing" insert --a--;

Column 3, line 19, delete "Fig. 2a" and insert --Fig. 2A--

UNITED STATES PATENT AND TRADEMARK OFFICE
CERTIFICATE OF CORRECTION

PATENT NO. : 4,027,292

DATED : May 31, 1977

INVENTOR(S) : Kiyokazu Okamoto et al

It is certified that error appears in the above-identified patent and that said Letters Patent are hereby corrected as shown below:

Column 3, line 65, delete "Fig. 2a" and insert --Fig. 2A--;

Column 3, line 68, delete "Fig. 2a" and insert --Fig. 2A--;

Column 4, line 3, delete "LOGIC 1" and insert --LOGIC 3--;

Column 4, line 47, after "as" insert --a--;

Column 4, line 49, delete "dimultiplexers" and insert -- demultiplexers --.

Column 4, line 50, after "sets" delete "1" and insert --$i_1$--;

Column 4, line 54, delete "sies" and insert --sides--

Column 5, line 8, delete "said" and insert --and--;

Column 5, line 9, before "connected" insert --is--;

Column 5, line 46, after "$i_{24}$" insert --$i_{25}$--;

Column 6, line 39, insert --storage--, before "register"

Column 7, line 48, delete "BUX-B" and insert --BUS-B--;

Column 9, line 29, delete "4" and insert -- ④ --;

UNITED STATES PATENT AND TRADEMARK OFFICE
CERTIFICATE OF CORRECTION

PATENT NO. : 4,027,292

DATED : May 31, 1977

INVENTOR(S) : Kiyokazu Okamoto et al

It is certified that error appears in the above-identified patent and that said Letters Patent are hereby corrected as shown below:

IN THE SPECIFICATION:

Column 9, line 39, delete "readonly" and insert --read-only--;

Column 10, line 9, the second "$i_{28}$" should be --$i_{29}$--;

Column 11, Section 5, change "$+_i$" to --+1--;

Column 13, line 31, delete "ROm" and insert --ROM--;

Column 13, line 33, after "storage" insert --register--;

Column 14, line 28, delete "51" and insert --$i_{51}$--;

Column 14, line 36, delete "regiter" and insert --register--;

Column 14, line 56, delete "MPS1" and insert --MPS 1--;

Column 14, line 67, "$1_1$" should be --$i_{11}$--;

Column 15, line 6, delete "MENORY" and insert --MEMORY--;

Column 15, line 9, insert --MPS 1-- after "units";

UNITED STATES PATENT AND TRADEMARK OFFICE
CERTIFICATE OF CORRECTION

PATENT NO. : 4,027,292
DATED : May 31, 1977
INVENTOR(S) : Kiyokazu Okamoto et al It is certified that error appears in the above-identified patent and that said Letters Patent are hereby corrected as shown below:

IN THE CLAIMS:

Claim 1, column 16, line 7, delete "units" and insert --unit--;

Claim 1, column 16, line 13, delete "data";

Claim 2, column 16, line 31, delete "claim 6" and insert --claim 1--;

Claim 2, column 16, line 39, after "said" insert --two--;

Claim 3, column 17, line 2, delete "circuit" and insert --circuits--;

Claim 4, column 18, line 12, delete "said";

Signed and Sealed this

Tenth Day of January 1978

[SEAL]

Attest:

RUTH C. MASON
Attesting Officer

LUTRELLE F. PARKER
Acting Commissioner of Patents and Trademarks